US011576231B2

(12) United States Patent
Chauhan et al.

(10) Patent No.: US 11,576,231 B2
(45) Date of Patent: Feb. 7, 2023

(54) SYSTEMS AND METHODS FOR NETWORK ADDRESS TRANSLATION

(71) Applicant: Verizon Patent and Licensing Inc., Basking Ridge, NJ (US)

(72) Inventors: Maqbool Chauhan, Keller, TX (US); Kirk Campbell, Long Valley, NJ (US); Parry Cornell Booker, Arlington, TX (US); Chad Allenbrand, Spring Hill, KS (US); Jerry Steben, Fort Worth, TX (US); David Taft, Keller, TX (US); Edward G. Leyton, Grapevine, TX (US); Anthony Mathias George, Springville, UT (US); Anthony Sirignano, Spring Hill, FL (US); Eric Handley, Olathe, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/907,638

(22) Filed: Jun. 22, 2020

(65) Prior Publication Data
US 2021/0400768 A1 Dec. 23, 2021

(51) Int. Cl.
*H04W 88/16* (2009.01)
*H04L 61/256* (2022.01)
*H04L 12/46* (2006.01)
*H04W 76/12* (2018.01)

(52) U.S. Cl.
CPC ......... *H04W 88/16* (2013.01); *H04L 12/4633* (2013.01); *H04L 61/256* (2013.01); *H04W 76/12* (2018.02); *H04L 2212/00* (2013.01)

(58) Field of Classification Search
CPC .. H04W 88/16; H04W 76/12; H04L 12/4633; H04L 61/256; H04L 2212/00; H04L 61/2007; H04L 61/2592; H04L 61/2514
See application file for complete search history.

(56) References Cited

U.S. PATENT DOCUMENTS

| 2015/0124622 | A1* | 5/2015 | Kovvali | H04L 67/1006 370/236 |
|---|---|---|---|---|
| 2018/0288614 | A1* | 10/2018 | Zaks | H04L 63/0428 |
| 2019/0069161 | A1* | 2/2019 | Zitzmann | H04W 68/005 |
| 2019/0116118 | A1* | 4/2019 | Kapela | H04L 69/22 |
| 2019/0116531 | A1* | 4/2019 | Ryu | H04W 36/0022 |
| 2021/0360110 | A1* | 11/2021 | Steben | H04M 15/64 |

FOREIGN PATENT DOCUMENTS

WO WO-2019086719 A1 * 5/2019 ......... H04L 12/1407

* cited by examiner

*Primary Examiner* — Hardikkumar D Patel

(57) ABSTRACT

A packet destined for a Multi-access Edge Computing (MEC) network is received at a wireless station from a user device. A serving gateway (SGW) receives the packet from the wireless station via an S1U GTP tunnel and assigns an uplink S1U General Packet Radio Service (GPRS) Tunneling Protocol (GTP) tunnel endpoint identifier (TEID) to the packet. The SGW performs a network address translation (NAT) function on the packet based on the uplink S1U GTP TEID assigned to the packet to form a translated packet. The SGW transmits the translated packet to the MEC network.

20 Claims, 8 Drawing Sheets

SYSTEMS AND METHODS FOR NETWORK ADDRESS TRANSLATION

BACKGROUND

Broadband cellular networks can provide various services and applications to user devices with optimized latency. For example, the use of Multi-access Edge Computing (MEC) platforms (also referred to as Mobile Edge Computing platforms) with 5G networks allows high network computing loads to be transferred onto edge servers, which can minimize latency and reduce backhaul delay among other things, depending on the network path between the edge servers and the point of attachment (e.g., a wireless station for a user device). In some situations, traffic targeted for a MEC will traverse a local breakout (LBO) serving gateway (SGW) out to the MEC. For this MEC traffic, without proper network address translation (NAT) functionality, traffic cannot be routed properly. In addition, without proper NAT functionality, private Internet Protocol (IP) addresses could be compromised.

DETAILED DESCRIPTION OF PREFERRED EMBODIMENTS

The following detailed description refers to the accompanying drawings. The same reference numbers in different drawings may identify the same or similar elements.

As usage of MEC platforms continues to grow, MEC instances may be deployed in Service Aggregation Point (SAP), Transport Aggregation Point (TAP), and centralized radio access network (C-RAN) sites across telecommunications networks. For low latency applications, MEC deployment may be in C-RAN and TAP locations. In order to meet service level agreements for low latency applications, user plane gateways co-located with MEC instances may be deployed at C-RAN and TAP sites.

For non-standalone (NSA) architectures, SGWs with LBO may be deployed in C-RAN and TAP locations. LBO provides a mechanism where roaming traffic is handled as close as possible to the user's location. Deploying SGWs with LBO may help steer MEC traffic toward local MEC instances. SGW LBO is a desired architecture, but it also may pose a number of challenges.

Currently, user devices accessing a data network are assigned a private IP address from a Packet Data Network (PDN) gateway (PGW). In order for the user device to access the data network, a PGW may perform a NAT function on the private IP address and assign a public address to the user device. With SGW LBO, a S5U General Packet Radio Service (GPRS) Tunneling Protocol (GTP) tunnel and PGW (including a NAT function in the PGW) are removed from the traffic path. With the NAT functionality removed, traffic may not be routed properly to and from the user device. In addition, without the NAT functionality, private IP addresses may be leaked or exposed.

According to implementations described herein, in order to route MEC downlink and uplink traffic destined for a particular user device and hide the private IP address for the user device, a NAT function may be implemented in the SGW with LBO. During the attach procedure, a user device may be assigned a unique downlink or uplink S1U GTP tunnel endpoint identifier (TEID). Systems and methods described herein provide an S1U GTP TEID-based NAT function in the SGW with LBO. This NAT function may aid in routing MEC downlink and uplink traffic and help prevent leakage of private IP addresses.

Figure 1:
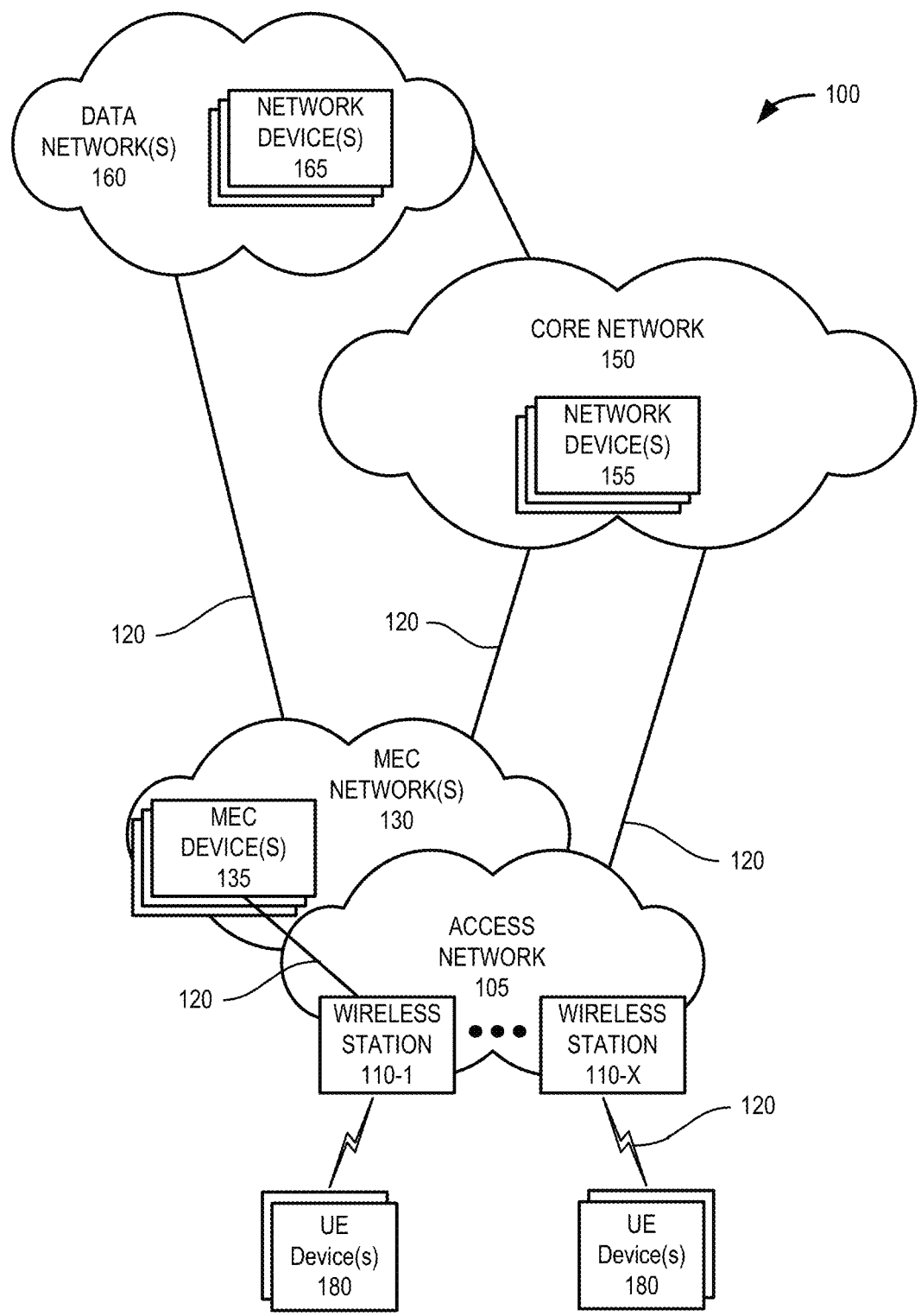
FIG. 1 is a diagram illustrating an exemplary network environment in which a MEC traffic breakout service described herein may be implemented.

FIG. 1 illustrates an exemplary environment 100 in which an embodiment of the S1U GTP TEID-based NAT function in the SGW with LBO may be implemented. As illustrated, environment 100 includes an access network 105, one or more MEC networks 130, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes multiple user equipment (UE) devices 180.

The number, the type, and the arrangement of network devices and the number of UE devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, and/or another type of computing architecture.

Environment 100 includes communication links 120 between the networks, between the network devices, and between UE devices 180 and the network devices. Environment 100 may be implemented to include wired, optical, and/or wireless communication links among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an "on-ramp" or connections to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include both eNBs and gNBs. In some implementations, wireless stations 110 may support separate control plane and user plane signaling. In other implementations, access network may support separate control plane and user plane signaling. For example, a gNB may include multiple decomposed distributed components, such as a central unit (CU) with separate control plane and user plane functionality, a distributed unit (DU), a remote unit (RU or a remote radio unit (RRU)), or another type of distributed arrangement.

MEC network 130 (also referred to as an "application service layer network" or "edge network") may include a platform that provides application services, such as low latency services, at the edge of a network. For purposes of illustration and description, MEC devices 135 may include various types of network devices that may be resident in MEC network 130. MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a control unit of a gNB). In other embodiments, wireless stations 110 may connect to MEC network 130 via wired (e.g., optical) backhaul links 120.

MEC network 130 may be implemented using one or multiple technologies including, for example, network function virtualization (NFV), software defined networking (SDN), cloud computing, webscale, or another type of network technology. Depending on the implementation, MEC network 130 may include, for example, virtualized network functions (VNFs), containerized network functions (CNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

Core network 150 may include one or multiple networks of one or multiple network types and technologies. For example, core network 150 may be implemented to include an Evolved Packet Core (EPC) of an LTE network, an LTE-A network, an LTE-A Pro network, a Next Generation Core (NGC), a 5G Core Network (5GC) for a 5G network and/or a legacy core network. According to one implementation, core network 150 may include an NSA core network to support dual coverage using 4G and 5G networks, referred to as interoperability Option 3x, or other 3GPP defined NSA-based architecture options. Core network 150 may manage communication sessions for UE devices 180. For example, core network 150 may establish an Internet Protocol (IP) connection between a UE device 180 and a MEC device 135 in a particular MEC network 130 location. Furthermore, core network 150 may enable UE device 180 to communicate with an application server or another type of network device 165 located in a particular data network 160.

Depending on the implementation, core network 150 may include various network elements that may be implemented in network devices 155. Such network elements may include a mobility and management entity (MME), a user plane function (UPF), a session management function (SMF), a core access and mobility management function (AMF), a unified data management (UDM), a PDN gateway (PGW), a serving gateway (SGW), a policy charging rules function (PCRF), a policy function (PCF), a policy control, a home subscriber server (HSS), as well other network elements pertaining to various network-related functions, such as billing, security, authentication and authorization, network polices, subscriber profiles, network slicing, and/or other network elements that facilitate the operation of core network 150. In the context of a core network that is configured to support 5G UE devices 180, core network 150 may include one or more network devices 155 with combined 4G and 5G functionality, such as a session management function with PDN gateway-control plane (SMF+PGW-C) and a user plane function with PDN gateway-user plane (UPF+PGW-U).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions.

UE devices 180 may each include a mobile device, such as wireless or cellular telephone device (e.g., a conventional cell phone with data processing capabilities), a smart phone, a personal digital assistant (PDA) that can include a radiotelephone, etc. In other implementations, UE devices 180 may be implemented as a machine-type communications (MTC) device, an Internet of Things (IoT) device, a machine-to-machine (M2M) device, etc., that includes communication functionality, such as a home appliance device, a home monitoring device, a surveillance camera, a medical monitoring device, etc. In another implementation, UE device 180 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. As described further herein, UE devices 180 or applications running on UE devices 180 may be configured for certain types of communications in network environment 100. For example, UE device 180 may be associated with an identifier such as network slice selection assistance information (NSSAI) that governs particular types of network traffic, such as traffic designated for MEC-based services.

Figure 2:
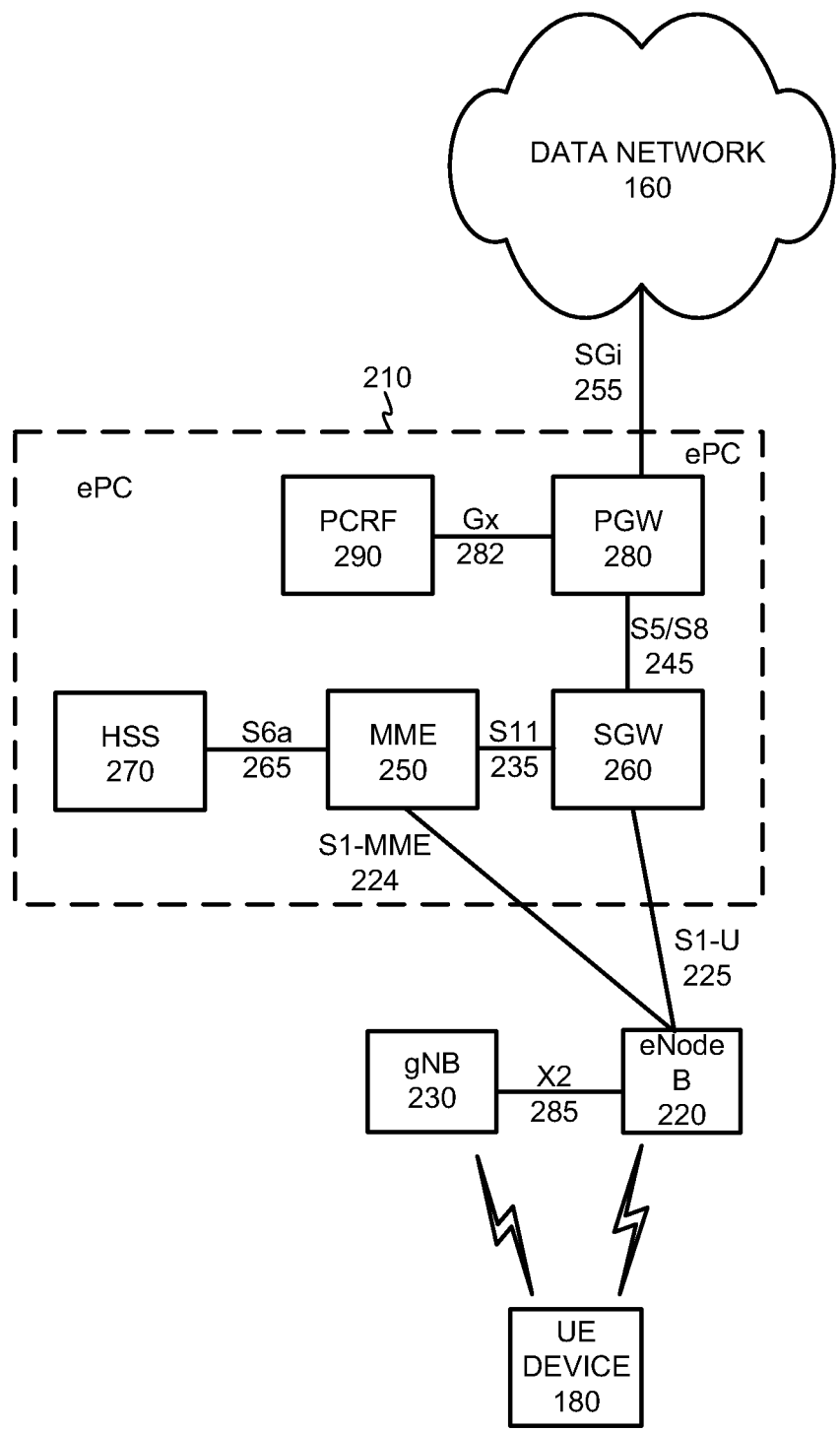
FIG. 2 is a block diagram illustrating exemplary network components in a portion of network environment of FIG. 1, according to an implementation.

FIG. 2 is a block diagram of an exemplary networking system 200 including access network 105 in which dual connection capability is provided to UE devices 180 using an Evolved Universal Mobile Telecommunications System (UMTS) Terrestrial Radio Access Network (E-UTRAN) and 5G New Radio (NR) RAN. In networking system 200, downlink and uplink packets can be transmitted over either/both of the radio access technologies. Thus, UE devices 180 may connect simultaneously to 5G NR and E-UTRAN for different bearers (e.g., different logical channels with particular end-to-end quality of service (QoS) requirements). In such instances, depending on radio coverage, some of these bearers could be supported by different wireless stations (such as an eNodeB for the E-UTRAN and a gNB for the 5G NR).

Access network 105 may include an LTE network with an evolved Packet Core (ePC) 210 and eNodeB 220 (corresponding, for example, to wireless station 110). UE device 180 and eNodeB 220 may exchange data over a RAT based on LTE air channel interface protocols. In the embodiment shown in FIG. 2, ePC 210 may operate in conjunction with an E-UTRAN that includes at least one eNodeB 220. Networking system 200 may further include an Internet Protocol (IP) network and/or a non-IP network, which may be embodied separately or included in a backhaul network (not shown) and/or in core network 150.

gNB 230 may include one or more devices and other components having functionality that allow UE device 180 to wirelessly connect to a 5G NR RAN and a 5G access network (not shown). eNodeB 220 and gNB 230 may communicate with each other via an X2 interface 285. X2 interface 285 may be implemented, for example, with a protocol stack that includes an X2 application protocol and Stream Control Transmission Protocol (SCTP).

EPC 210 may include one or more devices that are physical and/or logical entities interconnected via standardized interfaces. EPC 210 may provide wireless packet-switched services and wireless packet connectivity to user devices to provide, for example, data, voice, and/or multimedia services. EPC 210 may further include a mobility management entity (MME) 250, a serving gateway (SGW) 260, a home subscriber server (HSS) 270, a PGW 280, and a Policy and Charging Rules Function (PCRF) 290. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE device 180 to wirelessly connect via the RAT of eNodeB 220. ENodeB 220 may interface with ePC 210 via a S1 interface, which may be split into a control plane S1-MME interface 224 and a data plane S1-U interface 225. EnodeB 220 may interface with MME 250 via S1-MME interface 224, and interface with SGW 260 via S1-U interface 225. S1-U interface 225 may be implemented, for example, using general packet radio service (GPRS) Tunneling Protocol (GTP). S1-MME interface 224 may be implemented, for example, with a protocol stack that includes a Non-Access Stratum (NAS) protocol and/or Stream Control Transmission Protocol (SCTP). ENodeB 220 may transmit frequency band and service information being used by UE device 180 to ePC 210 via the S1 interface to enable QoS policy implementation and enforcement for 5G services when an NSA mode is being deployed.

MME 250 may implement control plane processing for both the primary access network and the secondary access network. MME 250 may select a particular SGW 260 for a particular UE device 180. MME 250 may interface with other MMES (not shown) in ePC 210 and may send and receive information associated with UE devices 180, which may allow one MME 250 to take over control plane processing of UE devices 180 serviced by another MME 250, if the other MME becomes unavailable.

SGW 260 may provide an access point to and from UE device 180, may handle forwarding of data packets for UE device 180, and may act as a local anchor point during handover procedures between eNodeBs 220. SGW 260 may interface with PGW 280 through an S5/S8 interface 245. S5/S8 interface 245 may be implemented, for example, using GTP. SGW 260 may provide an LBO service to transmit traffic to MEC network 130.

PGW 280 may function as a gateway to data network 160 through a SGi interface 255. Data network 160 may provide various services (e.g., firmware updates, over the top voice services, etc.) to UE device 180. A particular UE device 180, while connected to a single SGW 260, may be connected to multiple PGWs 280, one for each packet network with which UE device 180 communicates.

Alternatively, UE device 180 may exchange data with data network 160 through a WiFi wireless access point (WAP) (not shown). The WiFi WAP may be part of a local area network, and access data network 160 through a wired connection via a router. Alternatively, the WiFi WAP may be part of a mesh network (e.g., IEEE 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE device 180. S11 interface 235 may be activated when MME 250 needs to communicate with SGW 260, such as when the particular UE device 180 attaches to ePC 210, when bearers need to be added or modified for an existing session for the particular UE device 180, when a connection to a new PGW 280 needs to be created, or during a handover procedure (e.g., when the particular UE device 180 needs to switch to a different SGW 260).

HSS 270 may store information associated with UE device 180 and/or information associated with users of UE device 180. For example, HSS 270 may store user profiles that include registration, authentication, and access authorization information. MME 250 may communicate with HSS 270 through an S6a interface 265. S6a interface 265 may be implemented, for example, using a Diameter protocol.

PCRF 290 may provide policy control decision and flow based charging control functionalities. PCRF 290 may provide network control regarding service data flow detection, gating, quality of service (QoS) and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 282. Gx interface 282 may be implemented, for example, using a Diameter protocol.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
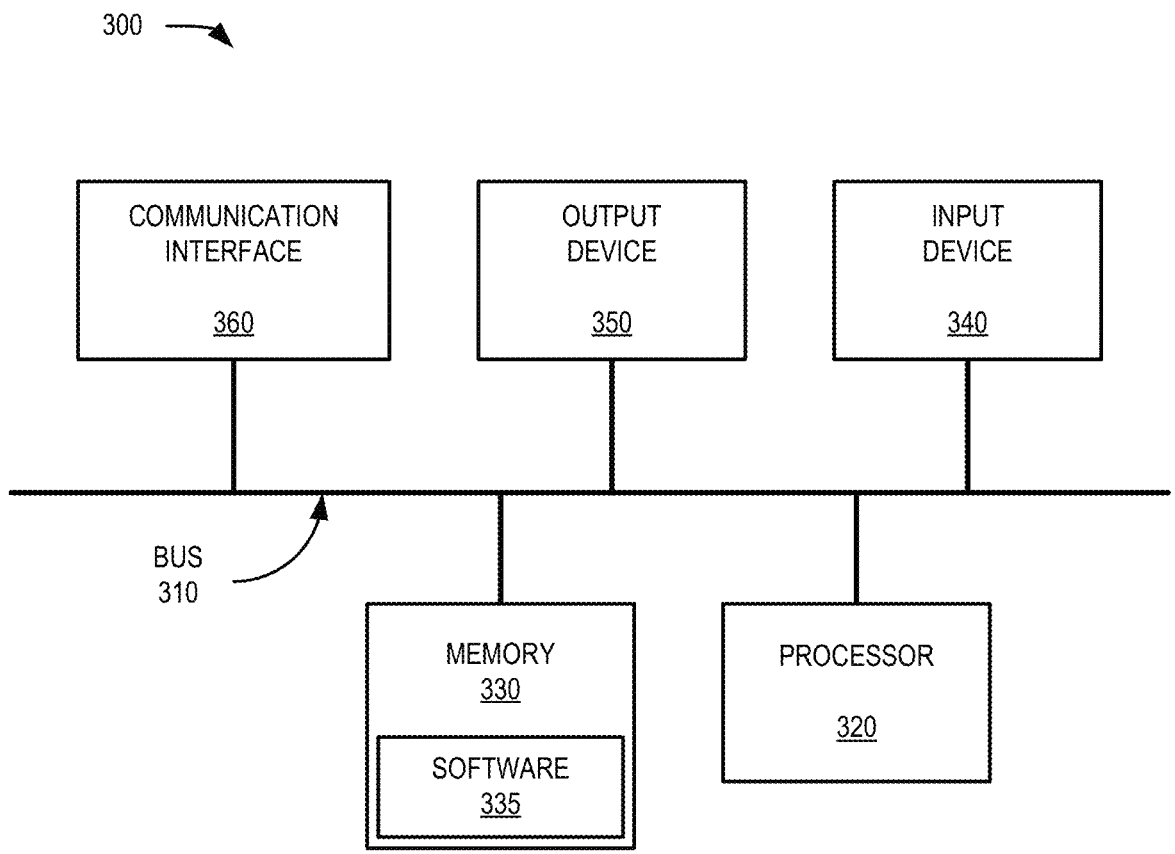
FIG. 3 is a diagram of exemplary components of a device that may be included in one or more of the components in the network environment of FIG. 1.

FIG. 3 is a diagram of exemplary components of a device 300. Device 300 may be included in wireless station 110 (e.g., including components eNodeB 220 and gNB 230), MEC device 135, network device 155, network device 165, UE device 180, or any of the elements of ePC 210 (e.g., SGW 260, PGW 280, etc.). As shown in FIG. 3, device 300 may include a bus 310, a processor 320, a memory 330, an input device 340, an output device 350, and a communication interface 360.

Bus 310 may include a path that permits communication among the components of device 300. Processor 320 may include a processor, a microprocessor, an application specific integrated circuit (ASIC), a field programmable gate array (FPGA), programmable logic device, chipset, application specific instruction-set processor (ASIP), system-on-chip (SoC), central processing unit (CPU) (e.g., one or multiple cores), graphical processing unit (GPU), microcontrollers, and/or other processing logic (e.g., embedded devices) capable of controlling device 300 and/or executing programs/instructions. Memory 330 may include any type of dynamic storage device that may store information and instructions, for execution by processor 320, and/or any type of non-volatile storage device that may store information for use by processor 320.

Software 335 includes an application or a program that provides a function and/or a process. Software 335 is also intended to include firmware, middleware, microcode, hardware description language (HDL), and/or other form of instruction. By way of example, when device 300 is a UE device 180, software 335 may include an application that is configured to use MEC services.

Input device 340 may include a mechanism that permits a user to input information to device 300, such as a keyboard, a keypad, a button, a switch, touch screen, etc. Output device 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions (e.g., software 335) contained in a computer-readable medium, such as memory 330. A computer-readable medium may be defined as a non-transitory memory device. A non-transitory memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

The configuration of components of device 300 illustrated in FIG. 3 is for illustrative purposes only. Other configurations may be implemented. Therefore, device 300 may include additional, fewer and/or different components, arranged in a different configuration, than depicted in FIG. 3.

Figure 4:
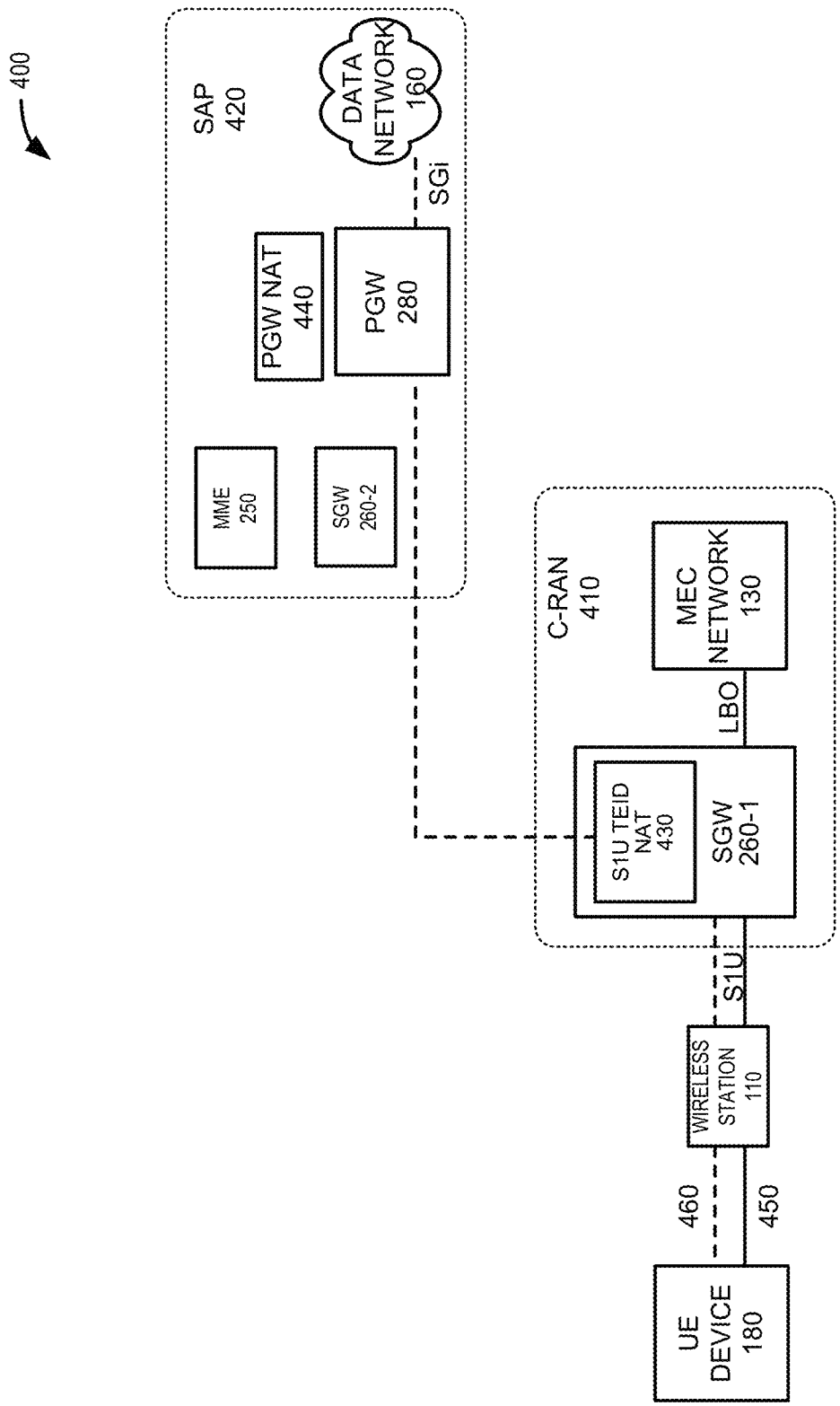
FIG. 4 is a block diagram illustrating exemplary network components in a portion of the network environment of FIG. 1.

FIG. 4 is a block diagram illustrating an environment 400 included in a portion of network environment 100 of FIG. 1. More particularly, FIG. 4 represents a MEC traffic breakout service with a SGW LBO based on user device usage type.

Network portion 400 may include UE device 180, wireless station 110, a C-RAN 410, and a SAP 420. Wireless station 110 may correspond to gNB 230 or eNodeB 220.

C-RAN 410 may include a group of network devices located at a network cloud. C-RAN 410 may correspond to an edge location within MEC network 130. C-RAN 410 may include SGW 260-1, MEC network 130, and S1U TEID NAT function 430.

SAP 420 may include core components of a wireless network that provides wireless access for a service to subscribing UE devices 180. In the configuration of network portion 400, SAP 420 may include MME 250, a SGW 260-2, PGW 280, and PGW NAT function 440, which provide for communications between subscribing UE devices 180 and devices (e.g., an application server or another network device, not shown) in data network 160.

Referring to FIG. 4, an example of different traffic flows for network portion 400 is shown. In FIG. 4, the dashed line 460 represents UE device traffic to and from data network 160 and solid line 450 represents UE device traffic to and from MEC network 130.

As shown by dashed line 460 in FIG. 4, traffic that originates at UE device 180 and is destined for data network 160 may initially flow to wireless station 110 and to SGW 260-1 via an S1U interface. The traffic bound for data network 160 may flow to PGW 280 in SAP 420. PGW NAT function 440 may translate a private IP address associated with UE device 180 to a public IP address and, after the NAT function has been implemented, the traffic may continue to flow to data network 160. For example, the traffic may be transmitted from PGW 280 to data network 160 via an SGi interface. In one implementation, PGW NAT function 440 may convert the private IP address to the public IP address based on an IP address and port of the source of the traffic (i.e., UE device 180) and an IP address and port of a destination of the traffic. For example, PGW NAT function 440 may perform a mathematical operation on the private IP address using the IP address and port of the source and IP address and port of the destination to generate a translated address.

As shown by solid line 450 in FIG. 4, traffic bound for MEC 130 may traverse from UE device 180 to wireless station 110 and continue to SGW 260-1 via an S1U GTP tunnel. The traffic may be broken out at SGW 260-1 and sent to MEC network 130. In order to properly route the traffic from SGW 260-1 to MEC network 130 and to avoid leaking or exposing the private IP address of UE device 180, SGW 260-1 may implement S1U TEID NAT function 430. S1U TEID NAT function 430 may map the IP address and port of the source (i.e., UE device 180) to the IP address and port of the destination (i.e., MEC 130) based on whether the traffic is uplink S1 TEID traffic or downlink S1 TEID traffic.

For example, as described below with respect to FIG. 5, each MEC-enabled UE device 180 may be assigned a unique uplink S1 TEID when S1U TEID NAT function 430 is implemented on traffic bound for MEC network 130. In one implementation, SGW 260-1 may assign the uplink S1 TEID for the uplink traffic originating from UE device 180. When the S1U TEID NAT function 430 function has been implemented, the traffic may be transmitted to MEC network 130 using a local breakout service.

In a similar manner, traffic originating at MEC network 130 and bound for UE device 180 may be transmitted from MEC network 130 to SGW 260-1. The downlink traffic may be assigned a unique downlink S1 TEID. In one implementation, wireless station 110 may assign the downlink S1 TEID to the downlink traffic destined for UE device 180. S1U TEID NAT function 430 function may be implemented at SGW 260-1 based on the downlink S1 TEID and the downlink traffic may be routed to UE 180 via the S1U GTP tunnel and wireless station 110.

Figure 5:
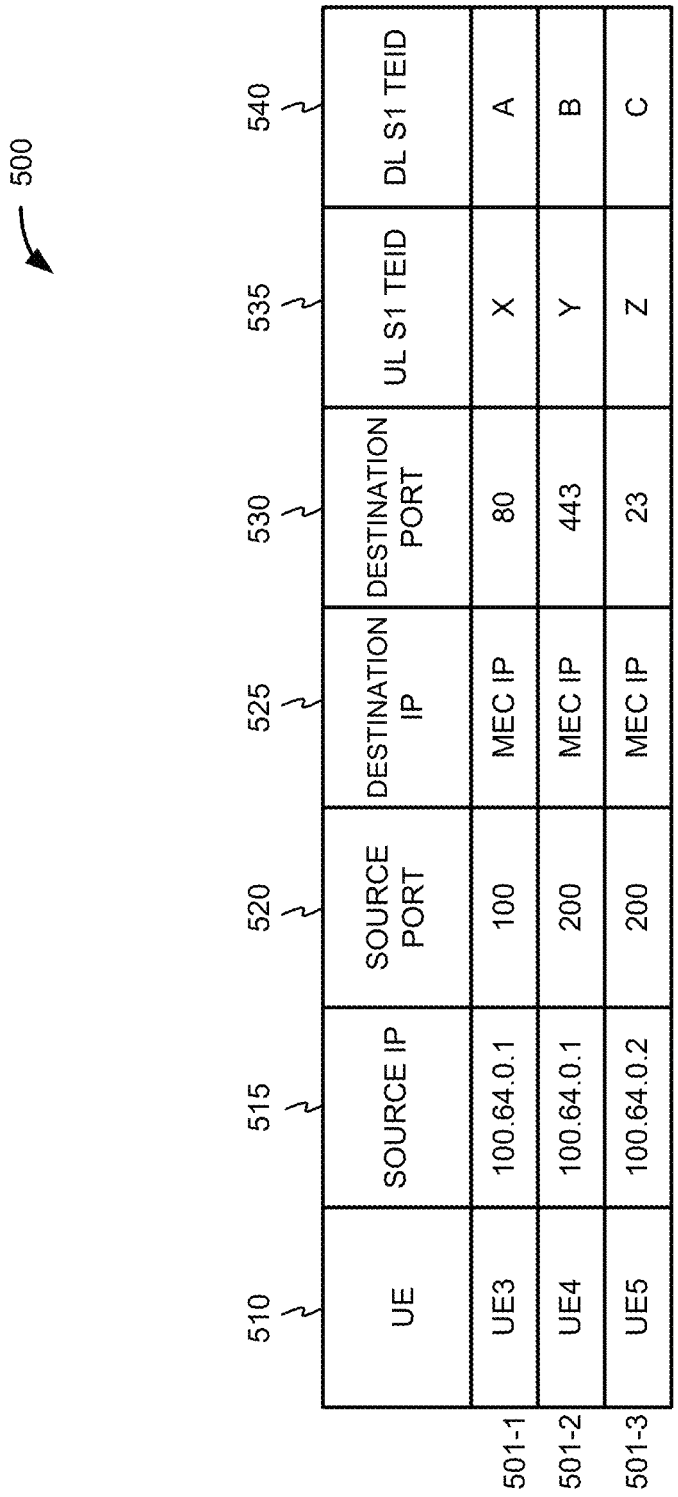
FIG. 5 is an exemplary NAT table according to an implementation.

FIG. 5 is a diagram illustrating exemplary S1U TEID-based NAT SGW LBO data that may be stored in a table 500. As illustrated, table 500 may include an MEC enabled UE field 510, a source IP field 515, a source port field 520, a destination IP field 525, a destination port field 530, an uplink S1 TEID field 535, and a downlink S1 TEID field 540. As further illustrated, table 500 includes entries 501-1 through 501-3 that each includes a grouping of fields 510, 515, 520, 525, 530, 535, and 540 that are correlated (e.g., together form a record, etc.). S1U TEID-based NAT SGW LBO data is illustrated in tabular form merely for the sake of description. In this regard, S1U TEID-based NAT SGW LBO data may be implemented in a data structure different from a table. The values illustrated in entries 501-1 to 501-3 are exemplary. According to other exemplary implementations, table 500 may store additional, fewer, and/or different instances of S1U TEID-based NAT SGW LBO data.

MEC enabled UE field 510 may store data indicating an identifier associated with UE device 180. Source IP field 515 may indicate an IP address associated with a traffic source. Source port field 520 may indicate a port associated with a traffic source. In one implementation, the traffic source may correspond to UE device 180. In this implementation, source IP field 515 may store an IP address associated with UE device 180 and source port field 520 may indicate a port associated with UE 180.

Destination IP field 525 may indicate an IP address associated with a traffic destination. Destination port field 530 may indicate a port associated with a traffic destination. In one implementation, the traffic destination may correspond to MEC network 130. In this implementation, destination IP field 525 may store an IP address associated with MEC network 130 and destination port field 530 may indicate a port associated with MEC network 130.

Uplink S1 TEID field 535 indicates an identifier associated with UE device 180 for uplink traffic for SGW LBO (i.e., traffic from UE 180 to MEC network 130) and downlink S1 TEID field 540 may store an identifier associated with UE device 180 for downlink traffic for SGW LBO (i.e., traffic from MEC network 130 to UE device 180). For UE device 180, the uplink S1 TEID may be different from the downlink S1 TEID. For example, as shown in FIG. 5, UE3 may have an uplink S1 TEID of X and a downlink S1 TEID of A. In addition, the uplink S1 TEIDs and downlink S1 TEIDs may be unique for each UE device 180. For example, as shown in FIG. 5, UE3, UE4, and UE5 may each have a different uplink S1 TEID (i.e., X, Y, and Z, respectively) and a different downlink S1 TEID (i.e., A, B, and C, respectively).

The S1U TEID NAT may be defined by the uplink and downlink S1 TEIDs. For traffic that originates at UE device 180 and is bound for MEC network 130, the uplink S1 TEID may be used when performing S1U TEID NAT function 430. In addition, for traffic that originates at MEC network 130 and is bound for UE device 180, the downlink S1 TEID may be used when performing S1U TEID NAT function 430. For example, as shown in table 500, UE3 and UE4 have the same source IP (i.e., 100.64.0.1), but UE3 and UE4 each have unique uplink TEIDs (i.e., X and Y, respectively) and downlink TEIDs (i.e., A and B, respectively). Therefore, for traffic originating at MEC network 130 and destined for UE3, S1U TEID NAT function 430 in SGW 260-1 may map the address based on source IP 100.64.0.1 and downlink S1 TEID A to properly route the traffic to UE3.

By using the uplink S1 TEID shown in table 500, traffic bound for MEC network 130 may be broken out at SGW LBO and properly sent to MEC network 130 without private IP addresses being leaked. In addition, traffic flowing from MEC network 130 to UE devices 180 may be properly routed to the UE device 180 based on the downlink S1 TEID.

Figure 6A:
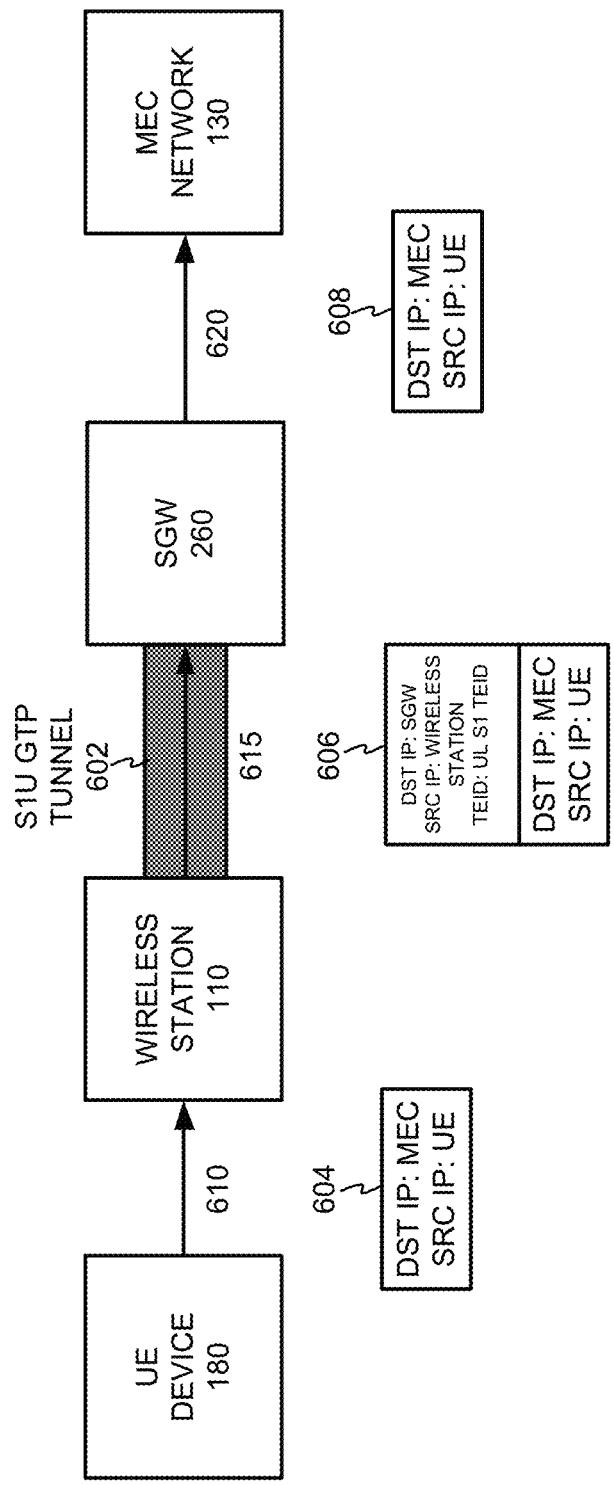
FIGS. 6A and 6B are block diagrams illustrating exemplary network components in a portion of network environment of FIG. 1.
Figure 6B:
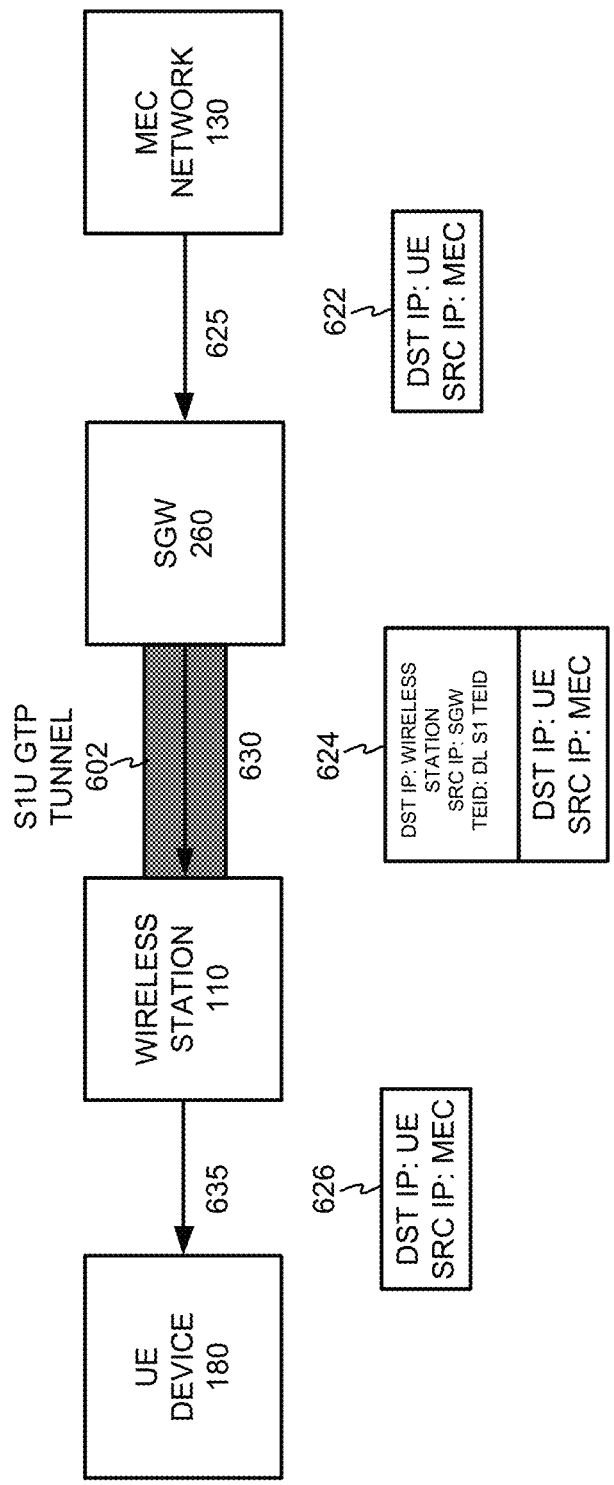

FIGS. 6A and 6B are block diagrams illustrating exemplary network components in a portion 600 of environment 400 of FIG. 4. More particularly, FIG. 6A represents uplink traffic from UE device 180 to MEC network 130 with a S1U TEID-based NAT function on SGW LBO. FIG. 6B represents downlink traffic from MEC network 130 to UE device 180 with a S1U TEID-based NAT function on SGW LBO.

As shown in FIG. 6A, uplink traffic originating at UE device 180 and bound for MEC network 130 may be transmitted from UE device 180 to wireless station 110 (610). Packets of the uplink traffic may include inner IP packets 604 or portions indicating an IP address of the destination (i.e., an IP address associated with MEC network 130) and an IP address of the source (i.e., a private IP address associated with UE device 180). SGW 260 may assign an uplink S1 TEID for the uplink traffic and wireless station 110 may encapsulate the inner IP packet to create an outer IP packet 606 prior to transmitting the packets to SGW 260 via S1U GTP tunnel 602. The outer IP packet 606 may include a destination IP address of S1U GTP tunnel 602 (i.e., an IP address associated with SGW 260), a source IP address of S1U GTP tunnel 602 (i.e., an IP address associated with wireless station 110), and the uplink S1 TEID assigned by SGW 260. The encapsulated packets may be transmitted to SGW 260 via S1U GTP tunnel 602 (615).

SGW 260 may receive the encapsulated packets and S1U TEID NAT function 430 may be implemented based on the source IP address, destination IP address, and uplink S1 TEID. SGW 260 may strip the packet of the outer IP packet information and may transmit the inner IP packets 608 with the translated IP addresses to MEC network 130 (620). For example, inner IP packets 608 may be broken out or separated from SGW 260 and transmitted to MEC network 130 using a local breakout service.

Similarly, as shown in FIG. 6B, downlink traffic originating from MEC network 130 and destined for UE device 180 may be transmitted from MEC network 130 to SGW 260 (625). The traffic may include packets including outer IP packets 622 indicating a destination IP address (i.e., a public IP address associated with UE device 180) and a source IP address (i.e., an IP address associated with MEC network 130). SGW 260 may receive the downlink packets and wireless station 110 may assign a downlink S1 TEID to the downlink packets. S1U TEID NAT function 430 may be implemented based on the source IP address, destination IP address, and downlink S1 TEID. SGW 260 may encapsulate the inner IP packets with an outer IP packet 624 including the destination IP address of S1U GTP tunnel 602 (i.e., an IP address associated with wireless station 110), a source IP of S1U GTP tunnel 602 (i.e., an IP address associated with SGW 260), and the downlink S1 TEID assigned by wireless station 110. The encapsulated packets may be transmitted to wireless station 110 via S1U GTP tunnel 602 (630).

Wireless station 110 may receive the encapsulated packets and may strip the outer IP packet to form inner IP packets 626 including the destination IP address (i.e., a private IP address associated with UE device 180) and the source IP address (i.e., the IP address associated with MEC network 130). After stripping the outer IP packets, wireless station 110 may transmit the traffic to UE device 180 (635).

Figure 7:
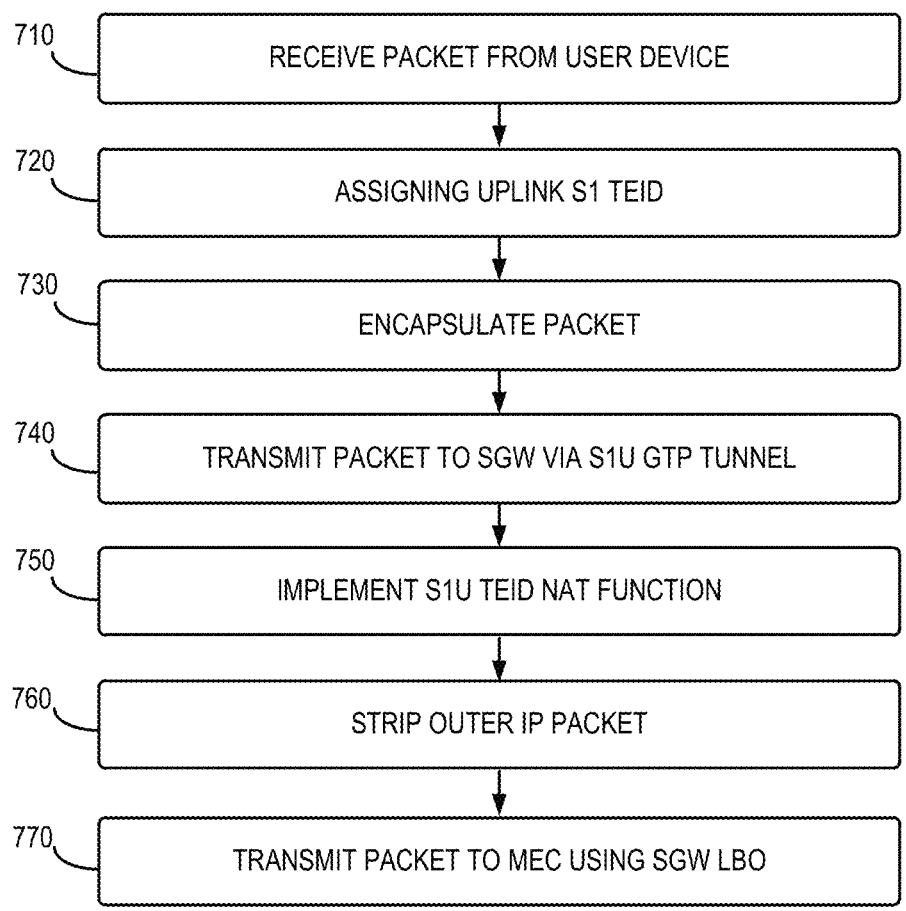
FIG. 7 is a flow diagram illustrating an exemplary process for performing a MEC traffic breakout using a NAT function at the SGW according to an implementation described herein.

FIG. 7 is a flow diagram illustrating an exemplary process 700 for performing SGW LBO on MEC-bound traffic using an S1U TEID NAT function. Process 700 may be performed by one or more devices, such as wireless station 110, MEC network 130, UE device 180, and SGW 260.

Process 700 may begin by wireless station 110 receiving a packet from UE device 180 that is destined for MEC network 130 (block 710). Each packet may include an inner IP packet indicating that the destination is an IP address of MEC network 130 and that a source is an IP address of UE device 180. Process 700 may continue by assigning an uplink S1 TEID to the packet (block 720). For example, SGW 260 may assign an uplink S1 TEID to the packet indicating that the packet originated at UE device 180 and the traffic is uplink traffic.

Wireless station 110 may encapsulate the packet with an outer IP packet (block 730). The outer IP packet may include a destination IP address of an S1U GTP tunnel, a source IP address of the S1U GTP tunnel, and the uplink S1 TEID assigned by SGW 260. In one implementation, the S1U GTP tunnel may connect wireless station 110 and SGW 260. In this implementation, the source IP address may include an IP address of wireless station 110 and the destination IP address may include an IP address of SGW 260.

Process 700 may continue by transmitting the packet to SGW 260 via the S1U GTP tunnel (block 740). SGW 260 may receive the packet and S1U TEID NAT function 430 may be implemented at SGW 260 (block 750). For example, SGW 260 may perform S1U TEID NAT function 430 based on the uplink S1 TEID assigned to the packet. SGW 260 may additionally strip the outer IP packet from the packet (block 760). For example, SGW 260 may remove the outer IP packet, and the inner IP packet with a translated IP address of UE device 180 may remain. SGW 260 may transmit the packet to MEC network 130 using an SGW LBO service (block 770). For example, the packet may be broken out at SGW 260 and transmitted to MEC network 130.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software (e.g., software 335).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   receiving, at a wireless station and from a user device, a packet destined for a Multi-access Edge Computing (MEC) network, wherein the packet includes an inner Internet Protocol (IP) packet indicating that the destination is an IP address of the MEC network and that a source is an IP address of the user device;
   assigning, by a serving gateway (SGW), an uplink S1U General Packet Radio Service (GPRS) Tunneling Protocol (GTP) tunnel endpoint identifier (TEID) to the packet;
   encapsulating, at the wireless station, the inner IP packet with an outer IP packet that includes the uplink GTP S1U TEID and a destination IP address and a source IP address of an S1U GTP tunnel connecting the wireless station and the SGW;
   performing, at the SGW, a first network address translation (NAT) function on the packet based on the uplink S1U GTP TEID assigned to the packet, wherein the first NAT function includes stripping the outer IP packet from the inner IP packet;
   transmitting, by the SGW and via a local breakout (LBO), the inner IP packet to the MEC network;
   receiving, at the wireless station and from the user device, data traffic destined for a packet data network (PDN);
   receiving, at the SGW, the data traffic from the wireless station via the S1U GTP tunnel; and
   forwarding, by the SGW, the data traffic to a PDN gateway (PGW) that performs a second NAT function on the data traffic and transmits the translated data traffic to the PDN, wherein the PGW and the PDN are located at a service aggregation point (SAP).

2. The method of claim 1, wherein the first NAT function includes an S1U TEID NAT function at the SGW.

3. The method of claim 1, further comprising:
   encapsulating the packet with a header including the S1U GTP TEID.

4. The method of claim 1, wherein the SGW is located at centralized radio access network (C-RAN) site that corresponds to an edge location within the MEC network.

5. The method of claim 1, further comprising:
   receiving, at the SGW and from the MEC network, a second packet destined for the user device;
   performing, by the SGW, a third NAT function on the packet based on a downlink S1U GTP TEID assigned to the packet; and
   transmitting, by the SGW, the second packet to the wireless station for transmitting to the user device.

6. The method of claim 5, wherein the downlink S1U GTP TEID is different from the uplink S1U GTP TEID.

7. The method of claim 1, wherein the uplink S1U GTP TEID is associated with the user device.

8. A system comprising:
   a wireless station configured to:
      receive, from a user device, a packet destined for a Multi-access Edge Computing (MEC) network, wherein the packet includes an inner Internet Protocol (IP) packet indicating that the destination is an IP address of the MEC network and that a source is an IP address of the user device, and
      receive, from the user device, data traffic destined for a packet data network (PDN); and
   a network device configured to:
      assign an uplink S1U General Packet Radio Service (GPRS) Tunneling Protocol (GTP) tunnel endpoint identifier (TEID) to the packet;
      encapsulate the inner IP packet with an outer IP packet that includes the uplink S1U GTP TEID and a destination IP address and a source IP address of an S1U GTP tunnel connecting the wireless station and the network device;
      perform a first network address translation (NAT) function on the packet based on the uplink S1U GTP TEID assigned to the packet, wherein the first NAT function includes stripping the outer IP packet from the inner IP packet;
      transmit, via a local breakout (LBO) the inner IP packet to the MEC network;
      receive the data traffic from the wireless station via the S1U GTP tunnel; and
      forward the data traffic to a PDN gateway (PGW) that performs a second NAT function on the data traffic and transmits the translated data traffic to the PDN, wherein the PGW and the PDN are located at a service aggregation point (SAP).

9. The system of claim 8, wherein the first NAT function includes an S1U TEID NAT function.

10. The system of claim 8, wherein the network device includes a serving gateway (SGW).

11. The system of claim 10, wherein the SGW is located at centralized radio access network (C-RAN) site that corresponds to an edge location within the MEC network.

12. The system of claim 8, wherein the network device is further configured to:

receive, from the MEC network, a second packet destined for the user device;

wherein the network device is further configured to:
    perform a third NAT function on the packet based on a downlink S1U GTP TEID assigned to the packet; and
    transmit the second packet to the wireless station for transmitting to the user device.

13. The system of claim 12, wherein the downlink S1U GTP TEID is different from the uplink S1U GTP TEID.

14. The system of claim 8, wherein the uplink S1U GTP TEID is associated with the user device.

15. A non-transitory computer-readable storage medium storing instructions executable by a processor of a network device, the instructions causing the processor to:
    receive, from a wireless station and via an S1U GTP tunnel, a packet destined for a Multi-access Edge Computing (MEC) network, wherein the packet was transmitted from a user device to the wireless station, and wherein the packet includes an inner Internet Protocol (IP) packet indicating that the destination is an IP address of the MEC network and that a source is an IP address of the user device;
    assign an uplink S1U General Packet Radio Service (GPRS) Tunneling Protocol (GTP) tunnel endpoint identifier (TEID) to the packet;
    encapsulate the inner IP packet with an outer IP packet that includes the uplink S1U GTP TEID and a destination IP address and a source IP address of an S1U GTP tunnel connecting the wireless station and the network device;
    perform a first network address translation (NAT) function on the packet based on the uplink S1U GTP TEID, wherein the first NAT function includes stripping the outer IP packet from the inner IP packet;
    transmit, via a local breakout (LBO) the inner IP packet to the MEC network;
    receive, from the wireless station and via the S1U GTP tunnel, data traffic from the user device destined for a packet data network (PDN); and
    forward the data traffic to a PDN gateway (PGW) that performs a second NAT function on the data traffic and transmits the translated data traffic to the PDN, wherein the PGW and the PDN are located at a service aggregation point (SAP).

16. The non-transitory computer-readable storage medium of claim 15, wherein the network device includes a serving gateway (SGW).

17. The non-transitory computer-readable storage medium of claim 15, wherein the first NAT function includes an S1U TEID NAT function.

18. The non-transitory computer-readable storage medium of claim 15, wherein the instructions further cause the processor to:
    receive, from the MEC network, a second packet destined for the user device;
    perform a third NAT function on the packet based on a downlink S1U GTP TEID assigned to the packet; and
    transmit the second packet to the wireless station for transmitting to the user device.

19. The non-transitory computer-readable storage medium of claim 18, wherein the downlink S1U GTP TEID is different from the uplink S1U GTP TEID.

20. The non-transitory computer-readable storage medium of claim 15, wherein the uplink S1U GTP TEID is associated with the user device.

* * * * *